(12) United States Patent
Eisermann et al.

(10) Patent No.: US 10,821,488 B2
(45) Date of Patent: Nov. 3, 2020

(54) METHOD AND DEVICE FOR CLEANING TUBE BUNDLES

(71) Applicant: LOBBE INDUSTRIESERVICE GMBH & CO. KG, Iserlohn (DE)

(72) Inventors: Reinhard Eisermann, Iserlohn (DE); Bodo Skaletz, Dinslaken (DE); Adrian Bernard, Iserlohn (DE)

(73) Assignee: LOBBE INDUSTRIESERVICE GMBH & CO. KG, Iserlohn (DE)

( * ) Notice: Subject to any disclaimer, the term of this patent is extended or adjusted under 35 U.S.C. 154(b) by 0 days.

(21) Appl. No.: 16/797,347

(22) Filed: Feb. 21, 2020

(65) Prior Publication Data

US 2020/0188971 A1 Jun. 18, 2020

Related U.S. Application Data

(62) Division of application No. 15/760,762, filed as application No. PCT/EP2016/071627 on Sep. 14, 2016.

(30) Foreign Application Priority Data

Sep. 21, 2015 (DE) .................. 10 2015 218 114

(51) Int. Cl.
*B08B 9/045* (2006.01)
*B08B 9/043* (2006.01)
(Continued)

(52) U.S. Cl.
CPC ............ *B08B 9/0433* (2013.01); *B01D 29/66* (2013.01); *B01D 46/0082* (2013.01);
(Continued)

(58) Field of Classification Search
None
See application file for complete search history.

(56) References Cited

U.S. PATENT DOCUMENTS

| 4,095,305 A | 6/1978 | Goodwin |
| 6,681,839 B1 | 1/2004 | Balzer |
| (Continued) | | |

FOREIGN PATENT DOCUMENTS

| DE | 3418835 A1 | 11/1985 |
| DE | 19932539 C1 | 8/2000 |
| (Continued) | | |

OTHER PUBLICATIONS

Author Unknown, Linear encoder, WIKIPEDIA.org, https://en.wikipedia.org/wiki/Linear_encoder, Nov. 14, 2016, pp. 1-7.
(Continued)

*Primary Examiner* — Mikhail Kornakov
*Assistant Examiner* — Ryan L. Coleman
(74) *Attorney, Agent, or Firm* — Hudak, Shunk & Farine Co. LPA

(57) ABSTRACT

A method and a cleaning device for cleaning tubes of tube bundles, wherein at least one rotating cleaning lance is used. During the insertion of the cleaning lance, the insertion depth E of the cleaning lance is measured and is stored and documented in a storage and documentation device. The cleaning device has an XY displacement device, on which a support rail is arranged, which supports a cleaning apparatus.

8 Claims, 8 Drawing Sheets

(51) Int. Cl.

| | | |
|---|---|---|
| *F28G 3/16* | (2006.01) | |
| *F28G 15/00* | (2006.01) | |
| *F28G 15/02* | (2006.01) | |
| *F28G 15/08* | (2006.01) | |
| *B01D 46/00* | (2006.01) | |
| *F28G 15/06* | (2006.01) | |
| *B01D 29/66* | (2006.01) | |

(52) U.S. Cl.
 CPC ............ *F28G 3/163* (2013.01); *F28G 15/003* (2013.01); *F28G 15/02* (2013.01); *F28G 15/06* (2013.01); *F28G 15/08* (2013.01)

(56) References Cited

U.S. PATENT DOCUMENTS

| | | |
|---|---|---|
| 2009/0255557 A1 | 10/2009 | Gardner |
| 2010/0126540 A1 | 5/2010 | Geppert |

FOREIGN PATENT DOCUMENTS

| | | |
|---|---|---|
| WO | 2004088235 A1 | 10/2004 |
| WO | 2011078916 A2 | 6/2011 |
| WO | 2015144889 A1 | 1/2015 |

OTHER PUBLICATIONS

Author Unknown, Rotary encoder, WIKIPEDIA.org, http://en.wikipedia.org/w/index.php?title=Rotary_encoder&oldid=673856541, Sep. 16, 2016, pp. 1-9.

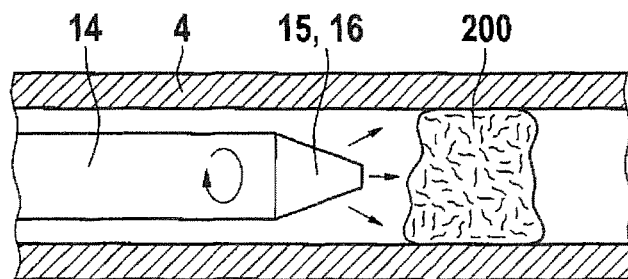
Fig. 10
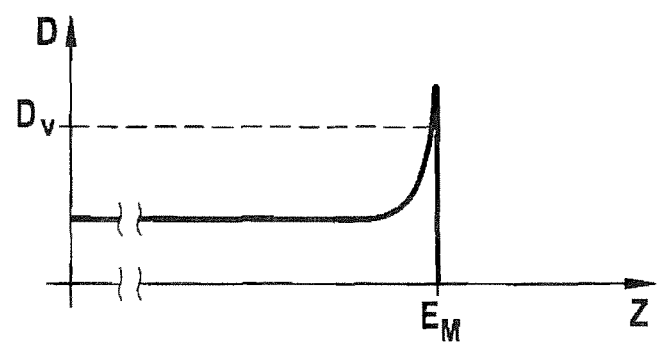
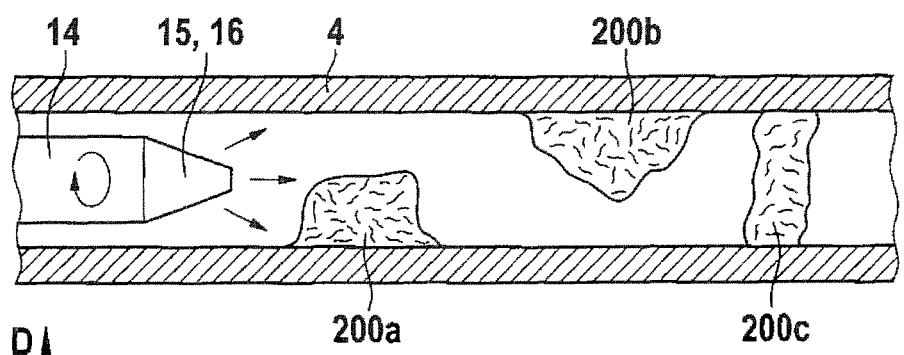
Fig. 11
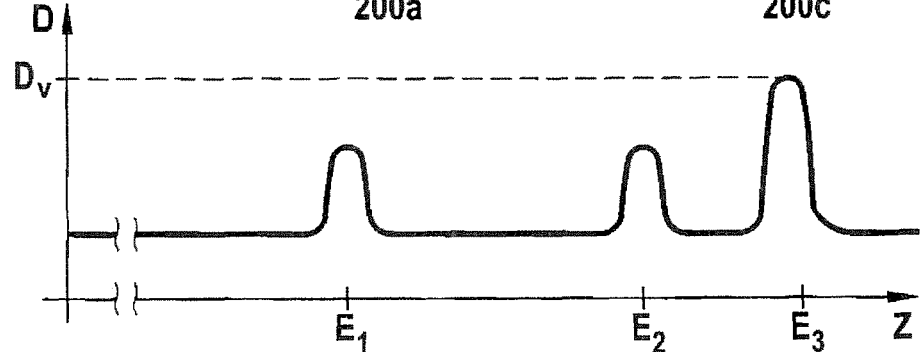

METHOD AND DEVICE FOR CLEANING TUBE BUNDLES

FIELD OF THE INVENTION

The invention relates to a method for cleaning of tube bundles, especially tube bundles of heat exchangers, air coolers, condensers, tubes or filter cartridges wherein at least one cleaning apparatus is positioned adjacently to the open ends of the tube bundle, wherein the cleaning apparatus comprises a cleaning device with a cleaning lance, the cleaning lance is then arranged along a travel path successively aligned with the particular tube of the tube bundle, the cleaning lance is placed in rotation and shoved into the respective tube and also supplied with liquid under high pressure.

Moreover, the invention relates to a device for cleaning of tube bundles with open ends at their end faces, especially tube bundles of heat exchangers, air coolers, condensers, tubes or filter cartridges with an XY-displacement device, with at least one cleaning device arranged on the XY-displacement device, and comprising a cleaning lance as well as a rotation device for rotating of the cleaning lance and a propelling device for extending and retracting the cleaning lance, and with a support rail for supporting the cleaning lance.

BACKGROUND OF THE INVENTION

Tube bundles are in industrial use in many applications, such as heat exchangers, condensers, air coolers, and so forth. Depending on the heat exchange medium, it cannot be prevented that the tubes of the tube bundle will become clogged or encrusted with dirt over a long period of use, which may mean that certain of the tubes will fail entirely. It is therefore necessary to clean the inside of the tubes of such tube bundles and optionally the reflector of the tube bundle from time to time.

This is generally done by opening the tube bundle and manually approaching it and pushing a high-pressure hose outfitted with a spray nozzle through the individual tubes at its front end, so that the cleaning fluid, especially water, being sprayed at high pressure from the spray nozzle removes the deposits on the internal walls of the tubes. In this process, the attendant is exposed to various hazards, depending on the environment where the tube bundle is located and depending on the nature and quality of the contamination in the tubes. Furthermore, during a manual cleaning by an attendant one cannot reliably avoid the possibility that various tubes are inadvertently passed over and not cleaned.

From DE 34 18 835 C2 there is known a method and a device for cleaning of tube bundles, in which a high-pressure hose is used. This known device serves in particular for cleaning of radioactively contaminated tube bundles substantially with no manual labor in their immediate vicinity. For this purpose, in the known device a video camera and lamps are arranged on a cleaning wagon and there is provided a remote control device with hand levers and with a monitor for the video camera, which controls the movements of the cleaning wagon and the high-pressure hose.

But this semi-automatic still requires attending personnel, which steer the remote control device with hand levers and track the activity through the images of the video camera. Operator errors thus are still not ruled out, i.e., it cannot be guaranteed that all tubes of the particular tube bundle will be cleaned.

U.S. Pat. No. 4,095,305 A discloses a cleaning apparatus for tube bundles in which instead of a high-pressure hose a cleaning lance is introduced into the tubes being cleaned. This known device has an XY-displacement device, which is fastened to the tube bundle. The XY-displacement device requires a frame with vertical and horizontal braces, the horizontal braces being designed to be manually movable along the vertical braces. A horizontally movable carriage is provided on the horizontal braces, on which a combined driving device is arranged for the rotation of the cleaning lance and its advancement.

Several uprights are provided for supporting the cleaning lance, being set up at a distance from each other and carrying a rail, on which are movably arranged lance guiding elements as well as a rotary connection device arranged at the end of the cleaning lance for the connecting of a pipe for the supply of cleaning fluid. These uprights are manually movable in the horizontal direction, so that the uprights can move along during the cleaning of one horizontal row of tubes. In order to clean another horizontal row, the rail must be manually moved on all the uprights in the vertical direction. At the same time, the horizontal braces with the carriage and the driving device arranged therein must likewise be moved in the vertical direction on the XY-displacement device.

This known device has a number of drawbacks. Many components need to be mounted and set up, and in the case of very long cleaning lance they need to be lined up. Not only the mounting is labor-intensive, but so too is the cleaning method, because both the XY-displacement device and the uprights need to be activated manually. The exact orientation of the individual components is required in order to avoid excessive bending of the cleaning lance in the cleaning operation. Furthermore, this will also damage the propelling and the rotation devices. The overall layout is unstable, which leads to further mechanical strain on the cleaning lance.

From US 2009/0255557 A1 there is known a cleaning apparatus for heat exchangers which works in automated manner. In this device, before the actual cleaning process, the position of all the tubes being cleaned is automatically detected, for example, by means of a laser scanner. In this way, the manual effort prior to the cleaning process is reduced. This device furnishes no information as to the degree of fouling of the tubes.

SUMMARY OF THE INVENTION

The problem which the invention proposes to solve is to indicate a cleaning method which is simple, fast, and reliable to carry out and which provides information as to the degree of fouling of the individual tube being cleaned. Another problem is to provide a corresponding device.

This problem is solved with a method for cleaning tubes of tube bundles, having open ends at their end faces, comprising the steps of: positioning at least one cleaning apparatus adjacently to the open ends of the tube bundle, wherein the cleaning apparatus comprises a cleaning device with a cleaning lance, arranging the cleaning lance along a travel path successively aligned with the particular tube of the tube bundle, placing the cleaning lance in rotation and shoving the cleaning lance into the respective tube and also supplying the cleaning lance with liquid under high pressure, measuring and monitoring a depth of insertion E of the rotating cleaning lance during the inserting of the cleaning lance into the respective tube of the tube bundle, and saving, processing, and documenting the depths of insertion E in a storage and documentation device, wherein for each cleaning process of a tube bundle at least the depths of insertion E are coordinated with the respective tubes and a three-dimensional cleaning profile of the tube bundle is produced and with a device for cleaning of tubes of tube bundles having open ends at their end faces, comprising: an XY-displacement device, with at least one cleaning device, arranged on the XY-displacement device, and comprising a cleaning lance as well as a rotation device for rotating of the cleaning lance and a propelling device for extending and retracting the cleaning lance, and with a support rail for supporting the cleaning lance, wherein the cleaning device comprises a measurement device for measuring depths of insertion E of the cleaning lance in the tubes and a storage and documentation device connected to the measurement device.

The method for cleaning of tubes is characterized in that the depth of insertion E of the rotating cleaning lance is measured and monitored during the inserting of the cleaning lance into the respective tube of the tube bundle and in that the depths of insertion E are saved, processed and documented in a storage and documentation device, wherein for each cleaning process of a tube bundle at least the depths of insertion E are coordinated with the respective tubes and a three-dimensional cleaning profile of the tube bundle is produced.

The method has the benefit that the cleaning of a tube bundle and the detecting of the degree of fouling of the tubes of the tube bundle can be done in a single work step. This means not only a time savings, but also affords the possibility of performing an after-cleaning of selected tubes at once after performing the cleaning process, based on the data obtained.

The monitoring of the depth of insertion preferably involves a constant observation, measuring and/or checking of the depth of insertion during the cleaning process in order to document the progress of the cleaning. It is also possible to register the maximum depths of insertion reached in addition or exclusively. By the insertion is meant both the introducing of the cleaning lance into the tube and the pushing of the cleaning lance through the respective tube.

The documentation preferably involves a coordinating of the respective measured depth of insertion with the particular tube, e.g., the tube number or the location of the tube, which is defined for example by corresponding X and Y coordinates. Moreover, the documentation preferably involves information as to whether each tube was approached and whether each tube was partly or fully cleaned. By saving this data, the completeness of the cleaning is documented.

The cleaning result is documented for each tube, so that a three-dimensional cleaning profile of the tube bundle can be created in connection with the depths of insertion. Such a cleaning profile has the benefit that structural weak points, such as for a heat exchanger, can be deduced from this, so that specific structural changes can be made in the heat exchanger in order to lessen the fouling and the degree of fouling of a tube bundle in future.

Thanks to the documentation, the user can determine whether or not a complete cleaning of the tubes of the tube bundle has been performed.

Preferably the cleaning method is semi-automatic or fully automatic. For this purpose, the cleaning apparatus according to the invention comprises a control device.

Operator errors are largely ruled out, since the control device approaches each tube of the tube bundle with the at least one cleaning device.

In a preferred embodiment it is proposed that the respective approaching and inserting movement of the particular cleaning device is performed automatically or semi-automatically by the control device with the aid of saved geometry data of the tubes of the tube bundle. By geometry data of the tubes is meant preferably the position coordinates of the tubes. The geometry data may also comprise tube spacings and/or diameters and/or tube length and/or the number of tubes.

Since the position coordinates of the tubes are known during the cleaning process, the so-called mirror image, or arrangement of tubes discernible at the end face of the tube bundle, may also be different. It is possible to assemble the tubes of the tube bundle into groups in which the tube spacings, for example, may be different, as is the case with divided heat exchangers, for example.

After positioning the cleaning apparatus at the end-face side of the respective tube bundle, the cleaning process can be done fully automatically or semi-automatically.

In a semi-automatic cleaning process, some of the chores are done by an attendant. This refers, e.g., to the manual approaching of reference points, reference tubes or tube rows, such as tube rows or tube columns. In the manual approaching or manual traveling of the cleaning device, corresponding control commands are entered by the attendant into the control device, preferably by means of a remote control. The remote control may be connected by a cable or by radio to the control device.

The fully automatic or semi-automatic cleaning of the tubes has the further benefit that the attendant can stand at a distance from the tube bundle, heat exchanger, etc., which is being cleaned. The attendant can remain outside the danger zone and thus does not come into contact with the tube contaminants during the cleaning process. A visual contact with the end face of the tube bundle is not absolutely required. With the aid of the flushing noises the attendant knows whether the cleaning lance is still in the tube or has been retracted from the tube, so that the command to proceed onward and save the data can be given, for example.

Besides the benefits of worker protection, there are also economic benefits. For example, thus far the manual cleaning of a tube bundle comprising 6000 tubes required two people working for ten days in a two-shift operation, while with the method according to the invention this work can be done in a quarter to a third of the time.

If the geometry data of the respective tube bundle is not available, according to a further preferred embodiment it is proposed that the geometry data on the tubes of the tube bundle is detected by manual approaching of the tubes by the at least one cleaning device. The at least one cleaning device is then positioned by an attendant intervening manually in the control device at all tubes of the tube bundle in succession, without the cleaning lance being inserted into the tubes.

The geometrical position of all the tubes of the tube bundle is detected and saved, so that the geometry data is available for the later cleaning process or the cleaning processes in future.

In order to further shorten the cleaning time, it is preferably proposed that a cleaning apparatus with several cleaning devices is used, whose cleaning lances are shoved at the same time into neighboring tubes, the depths of insertion of the cleaning lances being measured and stored independently of each other.

Preferably the measuring of the depth of insertion is done by means of a third driving device of a propelling device of the cleaning lance.

The measuring of the depth of insertion is done, e.g., by evaluating the number of revolutions of the drive shaft, taking into account the circumference of a driving wheel for the cleaning lance, for example. The depth of insertion can be ascertained with high precision in this way.

Preferably the measuring of the depth of insertion is done by means of a servomotor of the propelling device.

Preferably according to another embodiment the measuring of the depth of insertion can be done by sensing of measurement markings arranged on or in the cleaning lance.

Preferably the torque of the third driving device of the propelling device is measured continuously or discontinuously during the inserting of the cleaning lance into the tube and the measured torque values D are saved together with the respective depths of insertion E and coordinated with each other in the storage and documentation device. From the torque values D, the degree of fouling of the particular tube may be inferred.

Preferably during the insertion if the torque rises beyond a given value $D_v$ the third driving device is switched off, placed in reverse, or switched to a shaking mode. If the torque during the insertion rises beyond the given value $D_v$ and does not fall back to the normal value, the obstacle cannot be removed, or not easily removed, and the cleaning process should be interrupted at this point for the time being, so as not to damage the driving device and/or the exit nozzle situated at the front end of the cleaning lance.

The third driving device may alternatively be switched to a free rinse mode, in which the lance tip is held in front of the obstacle for a certain period of time, the obstacle is sprayed with the cleaning fluid under pressure, and after the period of time expires the high-pressure hose is again advanced. In this way, the obstacle may sometimes be flushed away, so that the cleaning process can continue to the end as planned in this tube.

The driving device in such cases can also be switched in reverse at once, in order to retract the cleaning lance from the tube.

The option also exists of switching the driving device to a shaking mode, so that the cleaning lance is moved back and forth several times, thereby mechanically working and possibly fragmenting the obstacle so that the advancement may be continued.

This data also is preferably saved in the storage and documentation device.

Preferably before the first insertion of the at least one cleaning lance into the tubes the orientation of the cleaning apparatus with respect to the tube bundle is ascertained and the data so determined is saved in the control device and used for correcting the travel path of the cleaning device.

The orientation of the cleaning device preferably relates to the orientation of the displacement device with respect to the tube rows, i.e., the tube rows or tube columns, in which case a so-called angle offset may occur. By allowing for the angle offset, the approach accuracy and thus the reliability of the cleaning apparatus is further enhanced. A mechanical adjusting of the displacement device can be eliminated in this way.

Preferably at least the first tube being cleaned for the tube bundle is approached manually.

Preferably the cleaning lance is shoved with a constant speed of advancement into the tubes. The speed of advancement can preferably be freely chosen.

The uniform movement of the tubes has the advantage that the cleaning process is performed everywhere with the same speed of advancement and thus with the same quality. In this way, there are no abrupt cleaning movements which might also result in falsification of the fouling data.

The cleaning apparatus according to the invention for the cleaning of tubes comprises an XY-displacement device, at least one cleaning device and at least one support rail. The cleaning device is arranged on the XY-displacement device and comprises a cleaning lance as well as a rotation device for rotating the cleaning lance and a displacement device for extending and retracting the cleaning lance. The support rail serves for supporting the cleaning lance. The cleaning device comprises a measurement device for measuring the depths of insertion E of the cleaning lance in the tubes and a storage and documentation device connected to the measurement device.

A cleaning lance comprises a lance tube, preferably a metal tube, as well as an exit nozzle, which is arranged at the front end of the lance tube which can be shoved into the tube being cleaned. Instead of a metal tube, another rigid material may also be used for the lance tube, such as a plastic material, although it must be kept in mind that the tube material has to withstand a pressure of the cleaning fluid of 25 bar to 3000 bar. Since the cleaning lance rotates, it is advantageous to provide in addition a cutting means at the exit nozzle or at the front end of the lance tube, so as to easily loosen incrustations inside the tube being cleaned.

The exit nozzle may have one or more outlet openings. The exit nozzle may also be arranged rotatable relative to the lance tube, for example, being driven by the cleaning fluid flowing through the lance tube.

The cleaning lance has a length which is preferably greater than the tube length of the tubes being cleaned. A cleaning lance may have a length, e.g., of up to 6 m.

The benefit of the cleaning apparatus is that the measurement device in combination with the storage and documentation device makes possible the detecting and processing of data on the fouling of the individual tubes in a simple manner, so that for each tube bundle the degree of fouling can be ascertained in detail. The cleaning process is accompanied by a detecting and evaluating of the fouling data, so that time is saved as compared to a separate ascertaining of the fouling data before the actual cleaning process.

Preferably the storage and documentation device is designed to store, process, prepare and evaluate data arising during the operation of the cleaning device and/or entered data. This makes possible not only a fully detailed detection of the degree of fouling, but also a semi-automatic or fully automatic performance of the cleaning method. The geometry data saved in the storage and documentation device, such as the XY-coordinates, therefore enables an automatic approaching of all tubes being cleaned and also the automatic approaching of the tubes selected on the basis of the fouling data in the case of an after-cleaning.

For this purpose, the storage and documentation device is preferably connected to a control device of the cleaning apparatus. The storage and documentation device may also be integrated in the control device.

Preferably several cleaning devices with their own propelling device and their own rotation device are provided, each cleaning device being outfitted with its own measurement device. Thanks to the use of two or more cleaning devices, the cleaning time and the data acquisition time are significantly shortened.

Preferably the XY-displacement device comprises a first and a second driving device, which are likewise connected to the control device.

The propelling device also preferably comprises a third driving device, which is connected to the control device. This makes possible an automatic performance of the tube cleaning.

The measurement device for measuring the depth of insertion may be arranged for example in the driving device of the propelling device or be integrated therein, e.g., by measuring the number of rotations of the drive shaft of the driving device. In this embodiment, the drive shaft is also part of this measurement device.

The measurement device preferably has measurement markings and at least one measurement sensor detecting the measurement markings, while the measurement markings are arranged on the cleaning lance or one of the moving components of the propelling device.

For example, one may consider measurement sensors for a magnetic sensing, an ultrasound sensing, or also the measuring of ohmic, inductive or capacitive resistances, or for an optical measurement. Eddy current sensors may also be used, which can measure wear-free measurement markings on metallic cleaning lances in a noncontact way with extremely high resolution.

According to one special embodiment, the measurement markings are provided on a driving wheel of the propelling device. The measuring of the depth of insertion can be done, e.g., by evaluating the number of revolutions of a driving wheel, taking into account the circumference of the driving wheel.

Preferably the propelling device comprises at least one servomotor, which drives the driving wheel. By servomotor is meant electric motors, which allow a checking of the angular position of the motor shaft and the rotary speed and acceleration. Servomotors generally have a sensor for determining the position of the motor shaft, which can be used as the measurement sensor of the measurement device. The rotary position of the motor shaft, as determined by the sensor, is relayed to a regulating electronics, known as a servo regulator. The servomotor has the benefit that, due to its design, components of the servomotor can be used for the measuring of the depth of insertion. The measurement device is preferably at least partly integrated in the servomotor.

Preferably the propelling device comprises a torque measuring device for the measuring of the torque of the third driving device. The benefits of the torque measurement are explained in connection with the cleaning method. When a servomotor is used, the torque measuring device can be integrated in the servomotor.

Preferably the propelling device is fastened to the support rail.

Preferably the propelling device comprises a driving means, such as a driving belt or a driving spindle.

Preferably the rotation device of the cleaning lance is arranged movable on the support rail and the propelling device engages with the rotation device. The rotation device and the support rail preferably form a profiled rail guidance. For example, the rotation device is secured to the driving belt.

The rotation device is preferably arranged at the rear end of the rotation lance. The cleaning lance is secured in the rotation device preferably in the longitudinal direction of the cleaning lance, so that a displacement of the rotation device also displaces the cleaning lance. This arrangement has the benefit that an axial displacement of the cleaning lance inside the rotation device is not necessary, as is the case with stationary mounted rotation devices. This simplifies the design of the rotation device. Furthermore, the rotation device may also have a rotary feedthrough for connecting of the supply hose or supply pipe.

The fourth driving device of the rotation device is preferably connected to the control device. The fourth driving device engages with the cleaning lance and places the cleaning lance in rotation.

In order to shorten the cleaning time, it is proposed that several parallel cleaning devices are provided with their own propelling device and/or their own rotation device, and each cleaning device may be equipped with its own measurement device.

The support rail in this embodiment should be designed to accommodate two or more cleaning devices. It is also possible to provide several support rails and to arrange them on the XY-displacement device.

Preferably the XY-displacement device comprises fastening means for fastening to the tube bundle. Preferably this means is designed so that the displacement device can be fastened exclusively to the tube bundle.

This has the benefit that the displacement device does not require any other frame or the like, or a cleaning wagon on which the displacement device is mounted. The XY-displacement device and thus the entire cleaning apparatus is therefore compact and requires but little space. Furthermore, the device can be mounted in a short time on the tube bundle being cleaned.

Another benefit of this embodiment is that the few components of the XY-displacement device make the transporting of the device easier. The tube bundle or heat exchanger being cleaned may have any desired position. The benefit of the displacement device is that it can be easily secured to both horizontal and vertical tube bundles. Thus, the cleaning of the tube bundle is not dependent on the position of the tube bundle.

Preferably the support rail is secured to the XY-displacement device. This produces a compact arrangement, in which the support rail does not have to be lined up with the XY-displacement device, as is required in the prior art. This significantly simplifies the mounting. The support rail is preferably fastened to one of the guide rails of the XY-displacement device, especially to the second guide rail. The support rail extends in the Z-direction and thus stands perpendicular to the XY-plane, subtended by the two guide rails.

The XY-displacement device comprises at least one first guide rail extending in the X-direction and at least one second guide rail which extends in the Y-direction, the support rail being on the second guide rail and movable in the Y-direction.

The support rail is preferably longer than the cleaning lance.

The guide rails preferably consist of a bending-stiff profile and can be outfitted with toothed racks, for example, with which the first and second driving devices can engage for the moving of the cleaning device.

Preferably the first guide rail comprises the means for fastening to the tube bundle and the second guide rail is arranged on the first guide rail and able to move along the first guide rail. Thus, the first guide rail is fixed in position and secured to the tube bundle and only the second guide rail can move relative to the first guide rail.

Preferably the cleaning device is arranged so that it can travel on the second guide rail.

Preferably a supporting device is provided, which supports the support rail. The supporting device is preferably only needed when using cleaning lances with a length of >2.5 m.

The supporting device according to one special embodiment is a suspension. The suspension is used when horizontally arranged tube bundles are being cleaned and the cleaning lance also has to be oriented horizontally.

The suspension preferably comprises hanger means, which are fastened to the rear end of the support rail, facing away from the XY-displacement device. The support rail is thus fixed only at two points, namely, at the front end and at the rear end, which simplifies the mounting and assures a stable arrangement.

Preferably the hanger means can travel in the X-direction parallel to the first guide rail. No driving device is needed for the horizontal travel of the hanger means. The hanger means are preferably freely movable, i.e., arranged with no drive unit. When a horizontal displacement of the cleaning device is performed by means of the XY-displacement device and the support rail is also thus displaced horizontally, the hanger means will automatically follow along.

Preferably the hanger means can move parallel to the second guide rail in the Y-direction by means of a fifth driving device.

The fifth driving device is preferably also connected to the control device in order to make possible an automatic performing of the cleaning method.

The fifth driving device is required when a vertical displacement of the cleaning device is being performed on the XY-displacement device.

According to another embodiment, the supporting device is a stiffening device. When upright tube bundles are being cleaned, the support rail extends vertically upward. Thus, a stiffening device is preferably provided as the supporting device instead of a suspension.

BRIEF DESCRIPTION OF THE DRAWINGS

Sample embodiments of the invention shall be explained more closely in the following. There are shown.

DETAILED DESCRIPTION OF THE INVENTION

Figure 1:
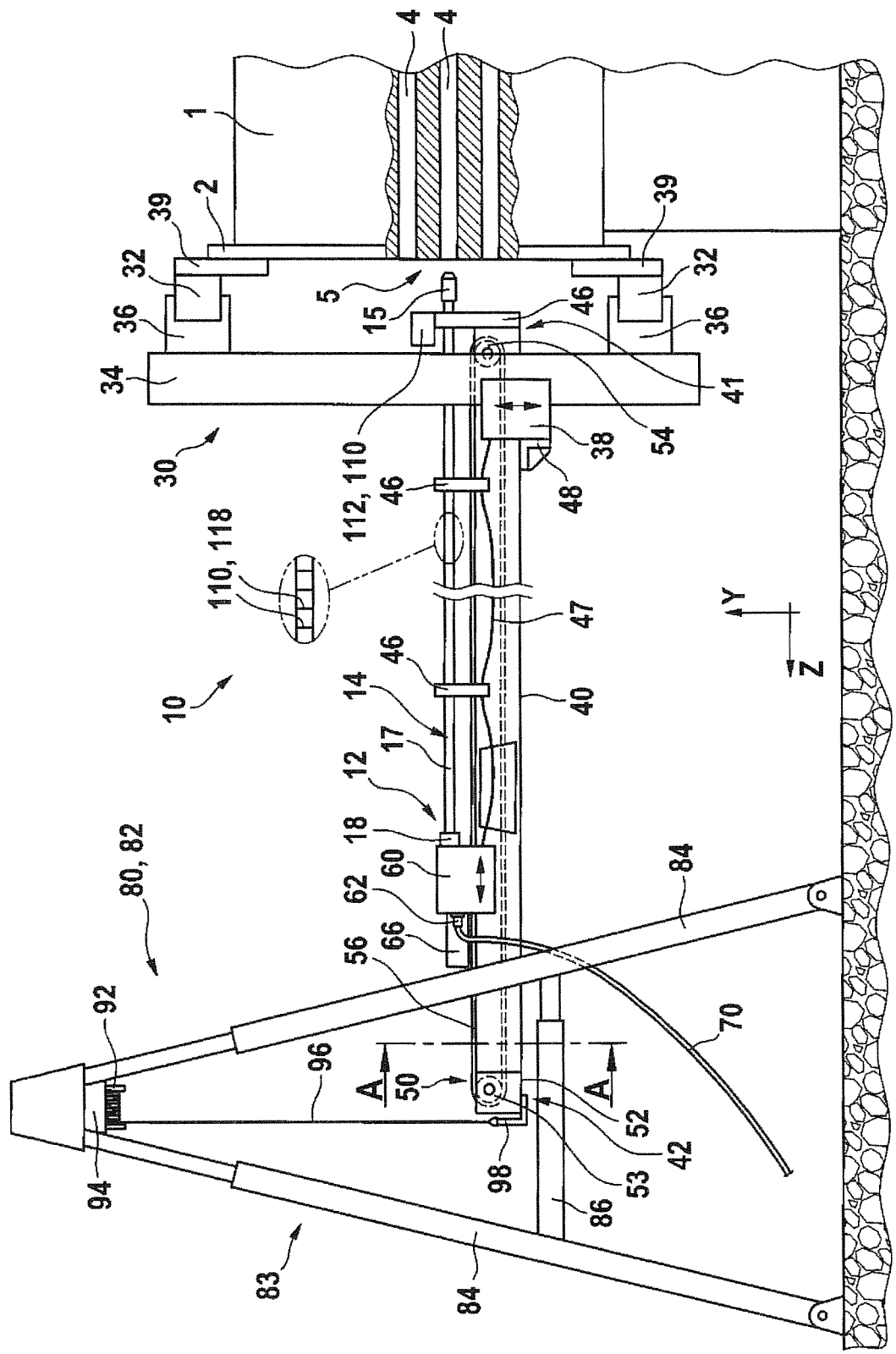
FIG. 1 a side view of the cleaning apparatus with cleaning lance not extended.

FIG. 1 shows a horizontally arranged tube bundle 1 partly in cross section, so that the individual tubes 4 of the tube bundle 1 can be seen. This might be, for example, a tube bundle of a heat exchanger, an air cooler, or a condenser. The tube bundle 1 has an open end 5, so that the interior of the parallel arranged tubes 4 are accessible for cleaning from there.

In front of the open end 5 of the tube bundle 1 is arranged a cleaning apparatus 10, comprising at least one cleaning device 12, an XY-displacement device 30, a support rail 40, a supply hose 70, which is connected to a high-pressure device (not shown) for providing a cleaning fluid, and a supporting device 80.

The cleaning device 12 comprises a cleaning lance 14, a propelling device 50 and a rotation device 60.

The XY-displacement device 30 is directly attached to a flange 2 of the tube bundle 1. Such a flange 2 is provided at the end face of the tube bundle 1, in order to secure a cover there (not shown). After removing the cover, this flange 2 can be used for attaching the XY-displacement device 30.

The XY-displacement device 30 comprises two first guide rails 32 extending horizontally, i.e., in the X-direction, and one second guide rail 34, extending vertically, i.e., in the Y-direction. The first guide rail 32 is arranged on the flange 2 of the tube bundle 1 by fastening means 39.

Figure 3:
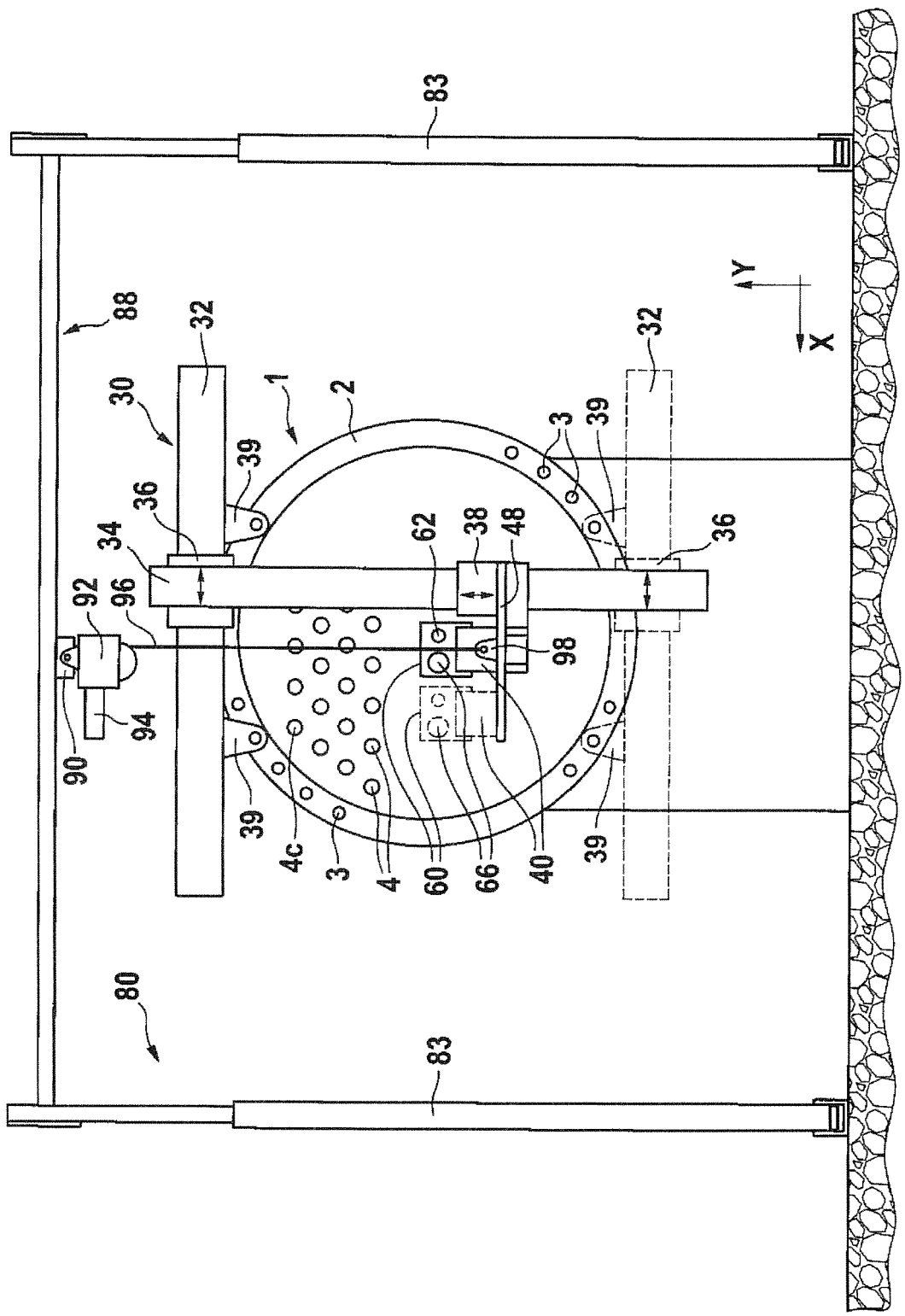

With the help of two first driving devices 36, which also comprise a trolley, the second guide rail 34 can travel in the X-direction on the first guide rail 32 (also see FIG. 3 for this). The support rail 40 is arranged on the second guide rail 34, extending in the Z-direction and oriented perpendicular to the second guide rail 34. This support rail 40 can travel by means of a second driving device, likewise comprising a trolley, along the second guide rail Y.

On the support rail 40 there is arranged a cleaning device 12, comprising the cleaning lance 14, which has a lance tube 17, at whose front end there is arranged a lance tip 15. The lance tip 15 comprises an exit nozzle 16 (see FIGS. 10 and 11) and a cleaning implement, not shown. The lance tip 15 is shown in front of a tube 4.

At the end of the cleaning lance 14 opposite the lance tip 15 there is provided a connection end 18, by which the cleaning lance 14 is connected to a rotation device 60. With the aid of this rotation device 60, which has a fourth driving device 66, the cleaning lance 14 is placed in rotation. At the opposite side of the rotation device 60 there is a rotary feedthrough 62, to which the supply hose 70 is connected for supplying cleaning fluid to the cleaning lance 14.

The rotation device 60 is adapted to travel on the support rail 40. The rotation device is driven by a propelling device 50, having a third driving device 52 at the rear end 42 of the support rail 40. The third driving device 52 drives a driving wheel 53, which drives a driving belt 56, especially a toothed belt. At the front end 41 of the support rail 40 there is provided a deflection roller 54. The driving belt 56 runs inside the support rail 40, designed as a hollow profile, and on top of the support rail 40.

Figure 2:
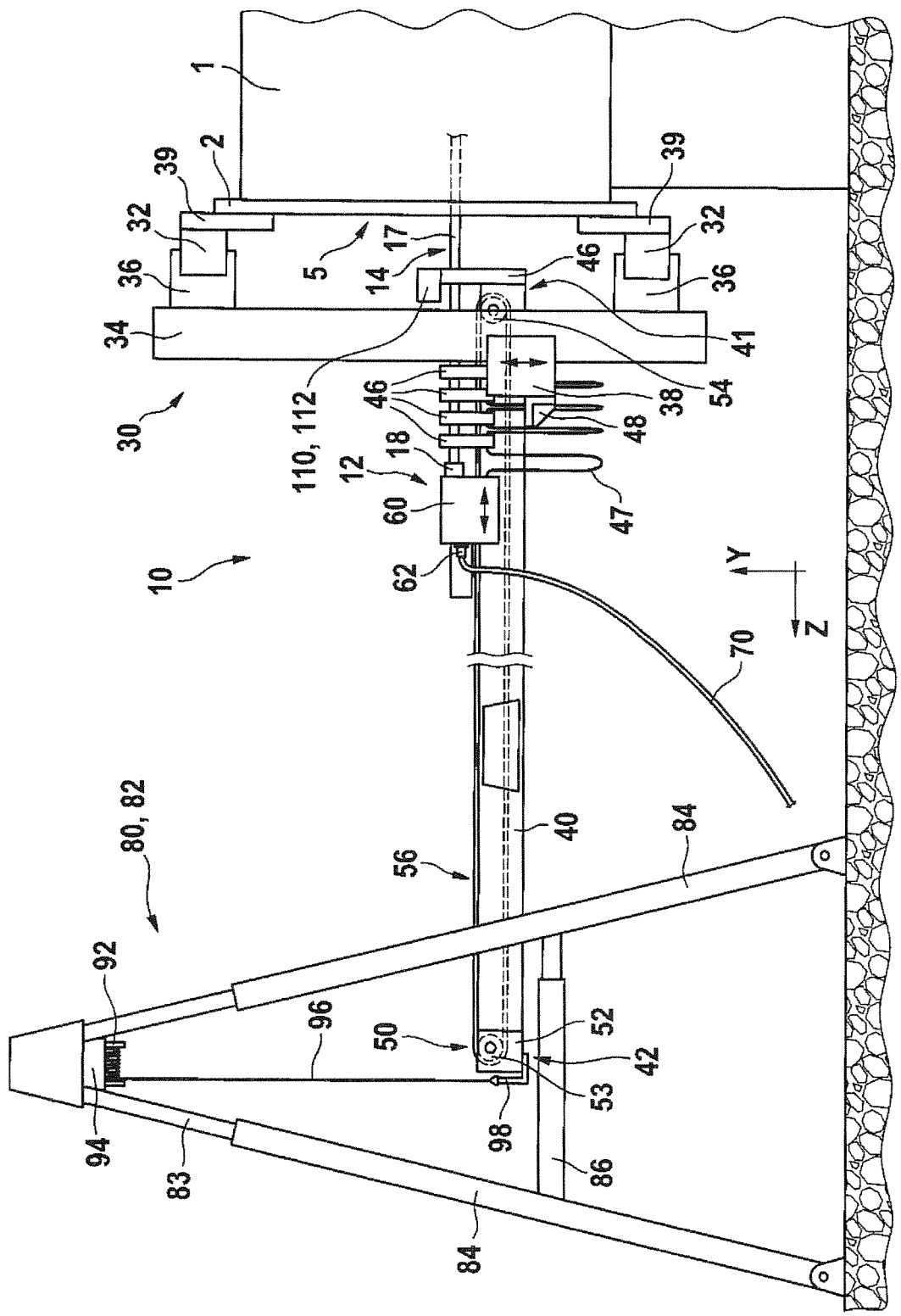
FIG. 2 the side view of FIG. 1 with cleaning lance extended into a tube of the tube bundle, FIG. 3 a top view of the cleaning apparatus represented in FIGS. 1 and 2, FIG. 4 a block diagram to explain the relationship of the different driving devices to the control device and the storage and documentation device, FIG. 5 a vertical cross section along line A-A in FIG. 1, FIG. 6 a detail view of the propelling device, FIG. 7 a top view of the end-face side of the tube bundle with a displacement device according to one embodiment, FIG. 8 another embodiment of the cleaning apparatus in side view for an upright tube bundle, FIG. 9 a top view of the cleaning apparatus shown in FIG. 8, FIGS. 10+11 two different incrustation situations in a tube with corresponding torque diagrams of a servomotor.

The rotation device 60 is fastened to the driving belt 56 and can thus travel along the support rail 40 in the Z-direction, so that the cleaning lance 14 can be extended into the tube 4, as shown in FIG. 2.

For the supporting of the cleaning lance 14 lance guide elements 46 are provided on the support rail 40. The lance guide element 46 at the front end 41 of the support rail 41 is stationary, while the other two lance guide elements 46 represented are movable on the support rail 40. The lance guide elements 46 are joined together by a flexible connection element 47, such as a cable. When the cleaning lance 14 is introduced (FIG. 2), the lance guide elements 46 are pushed together, and when it is retracted the lance guide elements 46 are again moved apart and positioned at a distance from each other.

The rear end 42 of the support rail 40 engages with a supporting device 80. This supporting device 80 in the embodiment shown here is designed as a suspension 82.

This suspension 82 comprises two support frames 83, which are joined together by a crosspiece 88, designed as a running rail. Each support frame 83 has two telescopically extensible support braces 84, which are joined together by a likewise telescopically extensible support frame crosspiece 86.

As can be seen from FIG. 3, a traveling crab 90 can travel freely on the crosspiece 88 or the running rail 88, having a cable winch 92 with a fifth driving device 94. On this cable winch 92 is arranged a hanger means 96 in the form of a cable, at whose lower end a holder 98 is fastened, engaging with the rear end 42 of the support rail 40.

When a horizontal displacement of the cleaning device 12 is carried out by means of the XY-displacement device 30, the traveling crab 90 is pulled into the corresponding position by the cable 96 and by the corresponding movement of the rear end 42 of the support rail 40. When a Y-displacement is carried out on the XY-displacement device 30, the fifth driving device 94 is actuated so that the cable 96 is pulled up or let down appropriately.

Furthermore, one can see in FIG. 3 a top view of the cleaning apparatus 10 represented in FIG. 1. The lower first guide rail 32 is shown by broken line, since this is only used optionally. When the cleaning lance has only a slight length, so that the support rail 40 can also be designed shorter, the lower first guide rail 32 is not required. With long cleaning lances and correspondingly long support rails 40 this second first guide rail 32 should be provided for stability reasons and this should likewise be fastened by fastening means 39 to fastening openings 3, which are provided for the fastening of the cover, on the flange 2 of the tube bundle 1.

The support rail 40 is connected by means of a connection element 48 to the trolley of the second driving device 38. The rotation device 60 has a fourth driving device 66, for example in the form of a pneumatic motor. The rotary feedthrough is designated as 62.

Besides the rotation device 60, another rotation device 60 is shown by broken line. The support rail 40 is likewise shown by broken line, since two cleaning devices 12 may also be arranged next to each other on the connection element 48.

Figure 4:
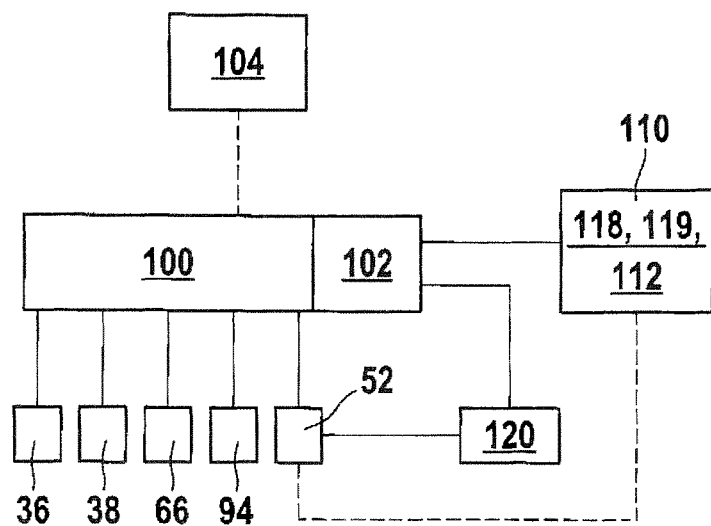

FIG. 4 shows a block diagram representing how the individual driving devices are interconnected with a control device 100 and a storage and documentation device 102. The control device 100 is connected to all five driving devices 36, 38, 52, 60 and 94 and can be activated by means of a remote control 104.

The storage and documentation device 102 may be a self-standing device, but it may also be an integrated component of the control device 100. The third driving device 52 of the propelling device 50 can be connected to a torque measuring device 120. This torque device 120 is likewise connected to the storage and documentation device 102.

Figure 6:
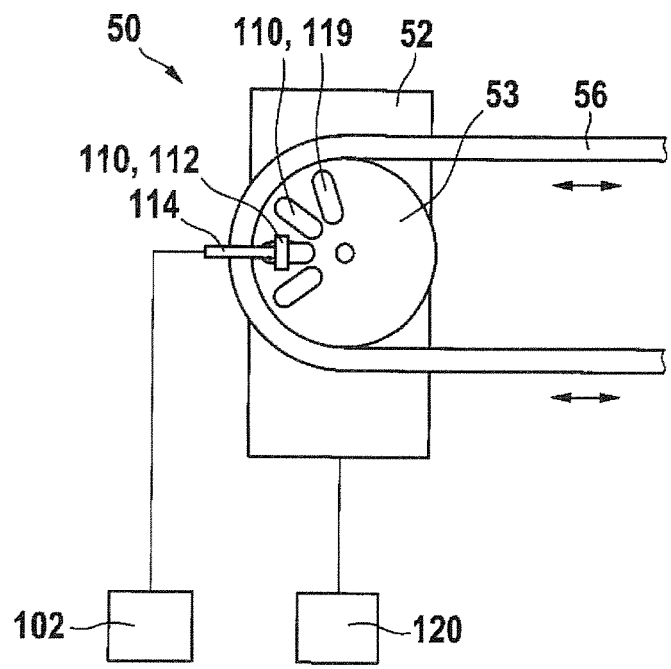

A measurement device 110 for measuring the depth of insertion is likewise connected to the storage and documentation device 102. This measurement device according to the embodiment shown in FIG. 1 may comprise measurement markings 118 on the cleaning lance 14, which can be optically detected, for example, by a measurement sensor 112 fastened to the front lance guide element 46. By counting the measurement markings 118 upon inserting the cleaning lance 14 at the tube 4, the depth of insertion E is measured. FIG. 6 shows another embodiment of the measurement device 110.

Figure 5:
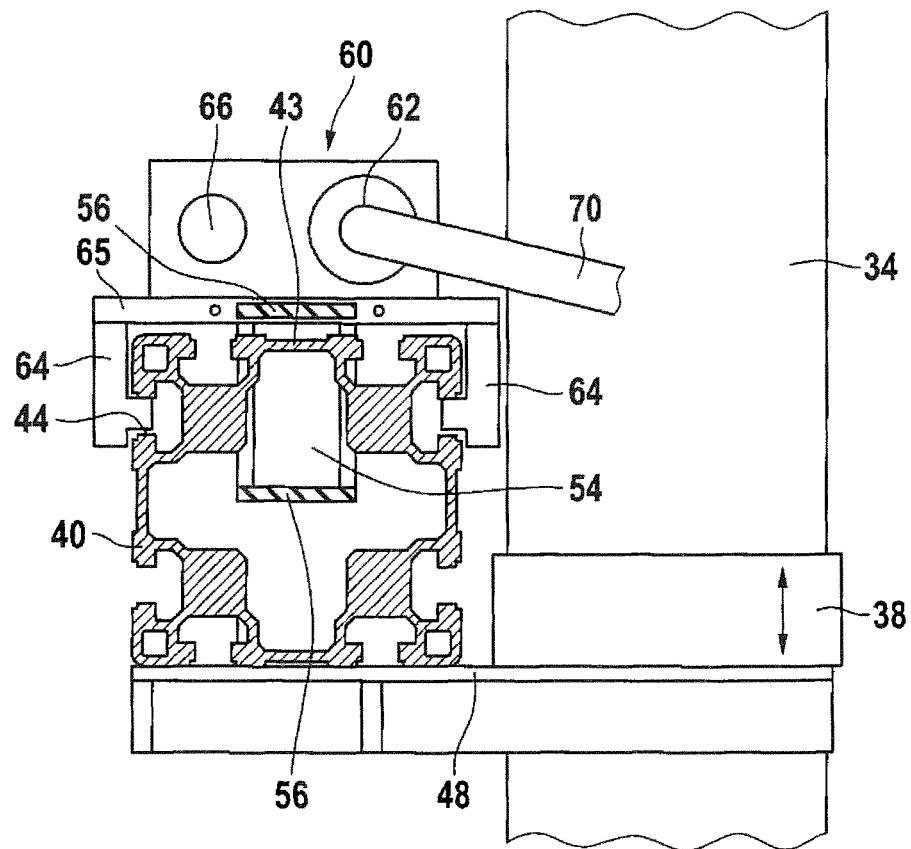

FIG. 5 shows a cross section along line A-A through the cleaning apparatus 10 represented in FIG. 1, in order to explain the profiled rail guidance of the rotation device 60 and the support rail 40. The support rail 40 is designed as a hollow profile, with the driving belt 56 running inside the hollow profile and being led upward by the deflection roller 54, where it is led on top of the leg 43 of the hollow profile. The rotation device 60 has rail elements 64, which engage with grooves 44 of the hollow profile. The rotation device 60 has a fastening plate 65, which is connected to the driving belt 56, so that the rotation device 60 can travel together with the cleaning lance 14 along the support rail 40.

FIG. 6 shows another embodiment of the measurement device 110. The driving wheel 53 of the third driving device 52 of the propelling device 50 has measurement markings 118 in the form of openings 119, which are detected by a measurement sensor 112. The measurement sensor 112 is fastened to a sensor holder 114 and connected to the storage and documentation device 102. By counting the measurement markings 118, the depth of insertion E is determined.

The driving device 52 is connected to a torque measuring device 120, which is likewise connected to the storage and documentation device 102.

Figure 7:
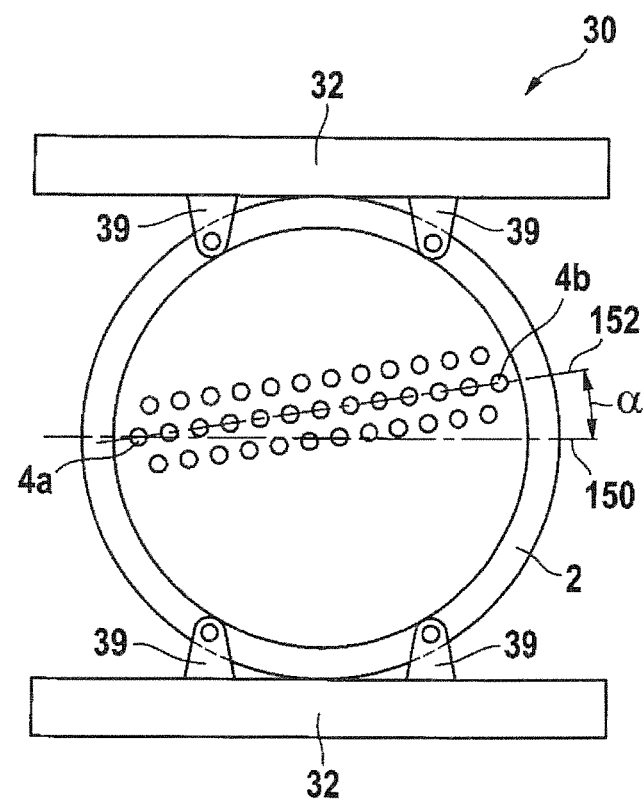

In FIG. 7, two first guide rails 32 are fastened to the flange 2 by way of the fastening means 39. Before the cleaning process is carried out, the orientation of the XY-displacement device 30 to the tube arrangement must be checked. As a rule, the first guide rail 32 may not be arranged parallel to the tube rows 152 on the flange 2, so that an angle offset a occurs. This angle offset a between the parallel line 150 to the first guide rail 32 and the tube row 152 is determined and saved in the control device 100, so that when moving the cleaning device 12 this angle offset a can be considered and factored into the position coordinates X and Y of the tubes 4.

For this purpose, the tube 4a for example is approached manually with the cleaning device 12 and the position is saved. After this, the cleaning device 12 is driven by means of the XY-displacement device 30 in front of the tube 4b and this position is likewise saved, from which the angle α of the tube row 152 can then be determined.

Figure 8:
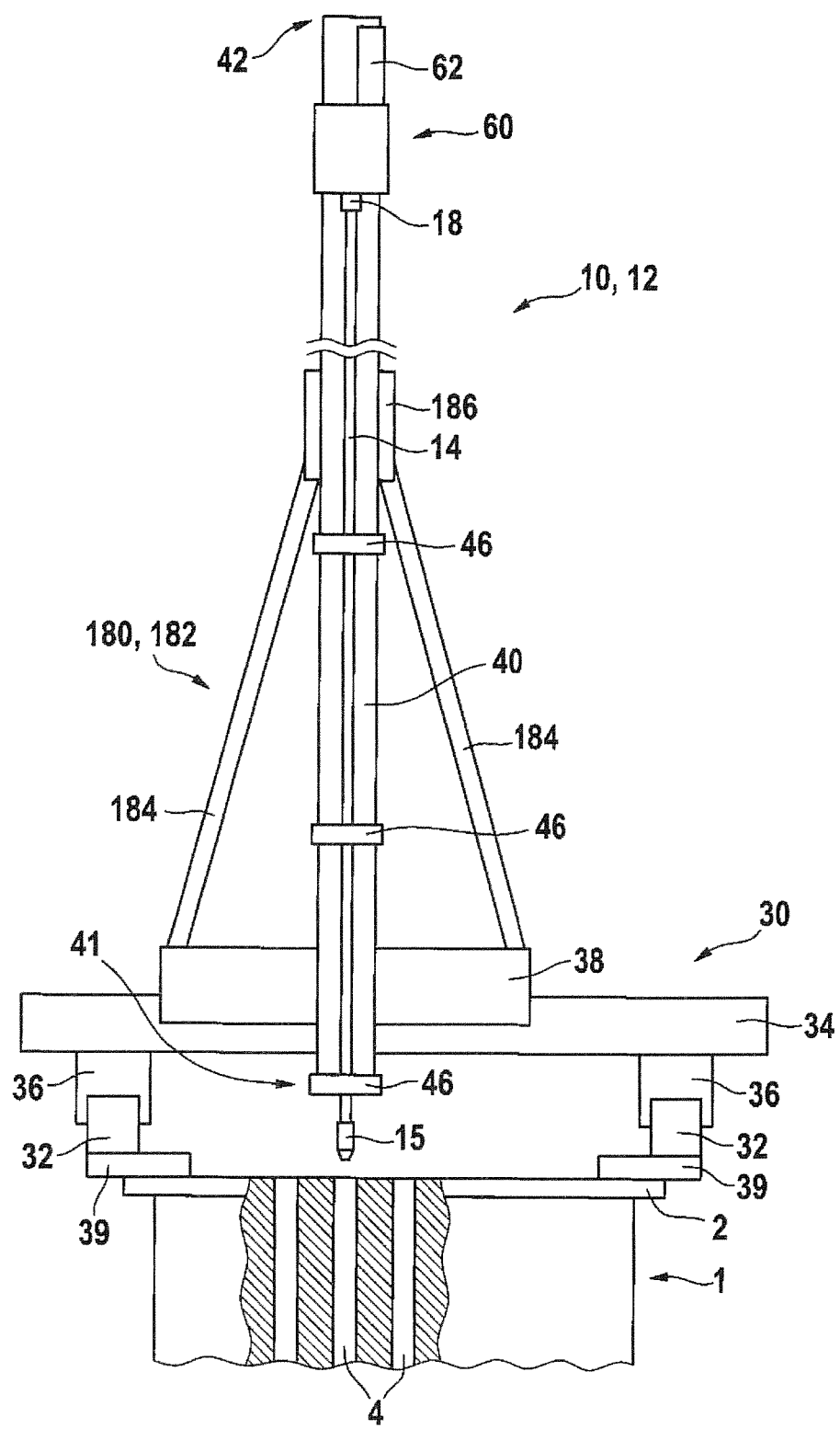

FIG. 8 shows another embodiment showing a cleaning apparatus 10 which is mounted on an upright tube bundle 1.

The XY-displacement device 30 corresponds to the XY-displacement device of FIG. 1. A support rail 40 is likewise arranged on the XY-displacement device 30, carrying the cleaning device 12 with lance 14 and rotation device 60. This arrangement likewise corresponds to the embodiment shown in FIG. 1. This also holds for the propelling device 50, which is not represented in FIG. 8.

The supporting device 180 is designed as a stiffening device 182 and comprises two stiffening elements 184, which are connected by a stiffening plate 186 to the support rail 40. The trolley of the second driving device 38 is designed distinctly longer than is represented in the embodiment of FIG. 1, so that the stiffening device 184 can be mounted there.

Figure 9:
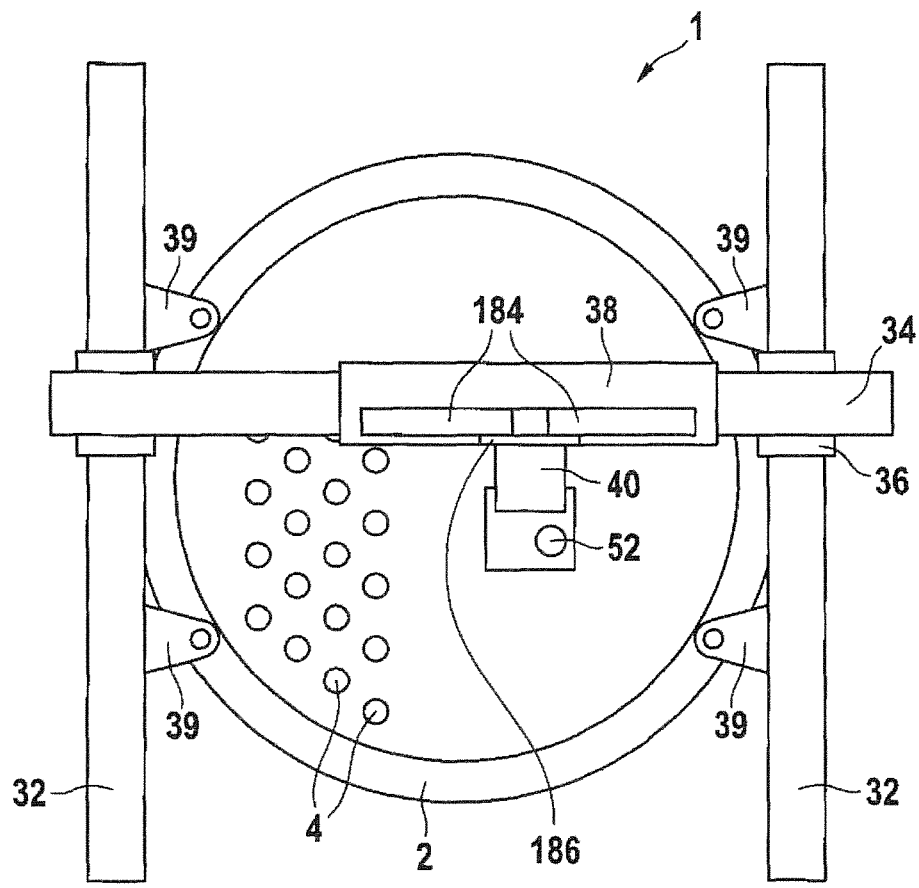

FIG. 9 is a top view of the embodiment shown in FIG. 8.

In FIGS. 10 and 11 are shown various obstacles in the form of incrustations 200, 202a, b, c inside the tubes 4. Beneath the respective tubes 4 is shown a schematic diagram of the torque D as a function of the distance z.

FIG. 10 shows an obstacle 200 which cannot be dissolved. The torque D of the third driving device 52 is constant upon inserting the cleaning lance 14 into the tube 4 and it increases abruptly when the lance tip 15 encounters by its exit nozzle 16 an obstacle in the form of an incrustation 200. The torque is detected with the torque measuring device 120, which is arranged e.g. in or on the servomotor of the third driving device 52 (also see FIG. 6).

This rapid increase is represented in the diagram of FIG. 10, this increase also marking the maximum depth of insertion $E_M$.

This obstacle 200 cannot be removed by means of the cleaning lance 14, so that the cleaning process of the tube 4 is broken off at this point. From the value of the torque D it can be determined that this is an insurmountable obstacle. The corresponding data, such as depth of insertion $E_M$ and torque D, are saved in the control device 100 or the storage and documentation device 102.

FIG. 11 shows two smaller and dissolvable incrustations 202a, 202b and a continuous dissolvable incrustation 200c. When the cleaning lance 14 encounters the incrustation 202a with the lance tip 15, the torque D increases. If it succeeds in loosening the first incrustation 202a, the advancement of the cleaning lance 14 may be continued, so that the torque of the third driving device 52 again drops until the cleaning lance 14 encounters by its lance tip 15 the next obstacle in the form of the incrustation 202b.

If the incrustation 202b there can also be loosened and removed, the torque again drops and the advancement may likewise be continued until the cleaning lance 14 encounters the third dissolvable obstacle 200c. After removing this obstacle 200c as well, the advancement may be continued further.

From the torque curve, represented only schematically, one may therefore determine how intense the fouling or the incrustations 200, 202a, b, c are inside the tube 4. With the aid of the data $E_1$, $E_2$, and $E_3$, one may then also locate the precise position where these contaminations occur.

Thus, with the aid of all the data, a three-dimensional cleaning profile of the tube bundle 1 can be produced, from which the location of the incrustations 200, 202a, b, c and the degree of incrustation or fouling can be determined.

A sample sequence of the cleaning of a tube bundle 1 may occur as follows:

The individual guide rails 34,36 are delivered together with the cleaning device(s) 12 and the control device 100 and assembled on site to form a cleaning apparatus 10. First of all, the first guide rail 32 is mounted on the tube bundle 1 and then the second guide rail 34 is mounted on the first guide rail 32.

The benefit of the cleaning apparatus 10, among other things, is that the guide rails 32,34 can be mounted on both horizontally oriented tube bundles 1 and on vertically oriented tube bundles 1. The cleaning apparatus 10 is far more flexible in application than the tube cleaning devices of the prior art, which are mounted for example on a wagon that has to be driven in front of the tube bundle 1 being cleaned, which is only possible in the case of horizontally arranged tube bundles 1.

Next, we determine the angle offset a and lay out the work zone. For this, we drive to four corner points situated outside of the tube bundle 1. The end face of the tube bundle 1 is then located inside the work zone in which the cleaning device(s) 12 can travel.

When this is a first-time cleaning process for a tube bundle 1, it is necessary to enter the geometry data in the control device 100. If this geometry data of the tubes 4 has been provided by the operator or manufacturer of the tube bundle 1 and has then been entered in the control device 100, the cleaning process may be started after the data entry, with the cleaning process starting for example at a reference tube 4c (see FIG. 3), which is approached manually. This may be, e.g., the first tube 4 of the first row of a tube bundle 1. The reference tube 4c may also be any given tube 4 of the tube bundle 1. If no geometry data is available, the geometry data is determined on site by means of a manual approaching of the tubes 4, and preferably the tubes 4 are also cleaned at the same time.

If the cleaning device 12 drives up to a tube 4 which is closed with a plug, the cleaning lance 14 cannot be inserted into the tube 4. Corresponding information is then assigned to this tube 4, that the cleaning lance 14 was not able to enter it. This data is then saved in the storage and documentation device 102.

If the cleaning lance 14 can be inserted into the tube 4 being cleaned, there are two possibilities. Either the cleaning lance 14 can be pushed in entirely to the opposite end of the tube 4. The cleaning may then take place as planned and this cleaning outcome is likewise documented by saving the raw data and the maximum achieved depth of insertion $L_E$.

If the tube 4 can only be partly entered, the cleaning does not take place as planned. The maximum achieved depth of insertion $E_M$ and optionally the occurring torques D are determined, so that further inferences can be made as to the degree of fouling. This data as well is then saved in the storage and documentation device 102.

If it is successful in removing the fouling by means of the inserted cleaning lance 14, this also is saved and documented.

When all tubes 4 of a tube bundle 1 have been approached, the cleaning process is finished.

The method according to the invention ensures that no tube is accidentally forgotten, as may be the case with a traditional manual cleaning of the tubes. Furthermore, the cleaning method is distinguished in that the cleaning processes in the tubes can be carried out with any desired speed of advancement of the cleaning lance and the cleaning implement, so that no abrupt changes or interruptions in the cleaning occur.

When several cleaning lances 14 are used at the same time, the cleaning time is further shortened. The cleaning device 12 will only move on when all cleaning lances 14 have left the tubes 4 approached by them. Especially when, for example, one of the cleaning lances 14 has been retracted ahead of time due to an insurmountable obstacle, it must wait for the other cleaning lance or lances 14 to have performed a complete cleaning of its (their) tubes.

LIST OF REFERENCE NUMBERS

1 Tube bundle
2 Flange
3 Fastening openings
4 Tube
4a,b,c Tube
5 Open end of tube bundle
10 Cleaning apparatus
12 Cleaning device
14 Cleaning lance
15 Tip of cleaning lance
16 Exit nozzle
17 Lance tube
18 Connection end
30 XY-displacement device
32 First guide rail (X)
34 Second guide rail (Y)
36 First driving device with trolley
38 Second driving device with trolley
39 Fastening means on flange
40 Support rail
41 Front end
42 Rear end 43 Leg
44 Groove
46 Lance guide element
47 Flexible connection element
48 Connection element
50 Propelling device
52 Third driving device
53 Driving wheel
54 Deflection roller
56 Driving belt
60 Rotation device
62 Rotary feedthrough
64 Rail element
65 Fastening plate
66 Fourth driving device
70 Supply hose
80 Supporting device
82 Suspension
83 Support frame
84 Support brace
86 Support frame crosspieces
88 Crosspieces, running rail
90 Traveling crab
92 Cable winch
94 Fifth driving device
96 Suspension means, cable
98 Holder
100 Control device
102 Storage and documentation device
104 Remote control
110 Measurement device
112 Measurement sensor
114 Sensor holder
118 Measurement markings on cleaning lance
119 Opening
120 Torque measuring device
150 Parallel line
152 Tube row
180 Supporting device
182 Stiffening device
184 Stiffening element
186 Stiffening plate
200 Incrustation
202a,b,c Incrustation

What is claimed is:

1. A method for cleaning tubes of a tube bundle, wherein each tube of the tube bundle comprises an open end at an end face of the tube bundle, and wherein the method comprises the steps of:

positioning at least one cleaning apparatus adjacent to the open ends of the tubes of the tube bundle, wherein the cleaning apparatus comprises a cleaning device with a cleaning lance, arranging the cleaning lance along a travel path successively aligned with each tube of the tube bundle, placing the cleaning lance in rotation and inserting the cleaning lance into each tube and also supplying the cleaning lance with liquid under a pressure of between 25 bar and 3000 bar, measuring and monitoring a depth of insertion E of the rotating cleaning lance for each tube of the tube bundle during the inserting of the cleaning lance into each tube of the tube bundle, and saving, processing, and documenting the depths of insertion E in a storage and documentation device such that a three-dimensional cleaning profile of the tube bundle is produced, wherein the three-dimensional cleaning profile comprises depths of insertion information for the tubes of the tube bundle, and wherein the measuring of the depth of insertion E is done by a driving device of a propelling device of the cleaning lance.

2. The method as claimed in claim 1, wherein the cleaning method is carried out in a semiautomatic or fully automatic way.

3. The method as claimed in claim 1, wherein the cleaning apparatus comprises a plurality of cleaning devices, wherein the plurality of cleaning devices comprises a plurality of cleaning lances that are inserted at the same time into neighboring tubes, and wherein depth of insertion data of each cleaning lance is measured and stored individually.

4. The method as claimed in claim 1, wherein torque values D of the driving device are measured continuously or discontinuously during the inserting of the cleaning lance into the tubes of the tube bundle, wherein the measured torque values D are saved with depths of insertion data, and wherein the measured torque values D are coordinated with depths of insertion data in the storage and documentation device.

5. The method as claimed in claim 4, wherein upon rise in the torque value beyond a given value $D_v$, the driving device is switched off, placed in reverse, switched to a free rinse mode or to a shaking mode.

6. The method as claimed in claim 1, wherein before inserting the cleaning lance into the tubes, the orientation of the cleaning apparatus relative to the tube bundle is determined and orientation data is saved and used for correcting the travel path of the cleaning device.

7. The method as claimed in claim 1, wherein at least the first tube being cleaned for the tube bundle is approached manually.

8. The method as claimed in claim 1, wherein the cleaning lance is shoved with a constant speed of advancement into the tubes.

* * * * *